(12) United States Patent
McFarling

(10) Patent No.: US 7,260,693 B2
(45) Date of Patent: Aug. 21, 2007

(54) ADAPTIVE DISK LAYOUT TECHNIQUES AND TOOLS

(75) Inventor: Scott Arthur McFarling, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 359 days.

(21) Appl. No.: 11/026,807

(22) Filed: Dec. 30, 2004

(65) Prior Publication Data

US 2006/0149892 A1    Jul. 6, 2006

(51) Int. Cl.
*G06F 12/00* (2006.01)

(52) U.S. Cl. ........................ 711/154; 711/113
(58) Field of Classification Search ............... 711/156, 711/113, 154
See application file for complete search history.

(56) References Cited

U.S. PATENT DOCUMENTS

| | | | |
|---|---|---|---|
| 5,220,667 A | 6/1993 | Ichieda | |
| 5,333,311 A | 7/1994 | Whipple, II | |
| 5,713,008 A | 1/1998 | Falkner | |
| 5,950,007 A | 9/1999 | Nishiyama et al. | |
| 6,009,481 A | * 12/1999 | Mayer | 710/33 |
| 6,073,232 A | 6/2000 | Kroeker et al. | |
| 6,317,818 B1 | 11/2001 | Zwiegincew et al. | |
| 2003/0212985 A1 | 11/2003 | Chan et al. | |

OTHER PUBLICATIONS

English et al., "Loge: a self-organizing disk controller," *Proc. USENIX Winter 1992 Tech. Conf.*, San Francisco, pp. 237-251 (Jan. 1992).

(Continued)

*Primary Examiner*—Hiep T. Nguyen
(74) *Attorney, Agent, or Firm*—Klarquist Sparkman, LLP

(57) ABSTRACT

In one aspect, in response to each of plural page faults, a copy of a requested virtual memory page is written to a sorted set of pages in the read order of the sorted pages. A copy of a modified or new data page also can be written to the sorted set. Sorting can be limited to certain kinds of pages (e.g., data pages). Temporary data pages can be deleted from a sorted set to improve efficiency. If a previously sorted page is requested, writing the page back to the sorted set can be omitted. A sorted set of pages also can be sorted based on retirement order. In another aspect, copies of pages that are accessed or not accessed in memory within certain time windows are written in a sorted order based on phase groups.

20 Claims, 21 Drawing Sheets

OTHER PUBLICATIONS

Griffioen et al., "Reducing File System Latency Using a Predictive Approach," 11 pp., no date.

Hatfield et al., "Program Restructuring for Virtual Memory," *IBM Sys. J.*, No. 3, pp. 168-192 (1971).

Kroeger et al., "Predicting Future File-system Actions from Prior Events," *Proc. USENIX Annual Tech. Conf.*, San Diego, pp. 1-10 (Jan. 1996).

Palmer et al., "Fido: A Cache that Learns to Fetch," *Proc. 17th Int'l Conf. on Very Large Databases*, Barcelona, pp. 255-264 (Sep. 1991).

Patterson et al., "Informed Prefetching and Caching," *Proc. 15th ACM Symp. on Operating System Principles*, Copper Mountain Resort, CO, pp. 79-95 (Dec. 1995).

Staelin et al., "Smart Filesystems," *Proc. USENIX—Winter '91*, Dallas, TX, pp. 45-51 (1991).

Tait et al., "Detection and Exploitation of File Working Sets," *IEEE*, pp. 2-9 (1991).

Ron White, *How Computers Work*, Que Corporation, pp. 128-152 ($6^{th}$ ed., 2002).

John L. Hennessy & David A. Patterson, *Computer Architecture: A Quantitative Approach*, Morgan Kaufmann Publishers, Inc., pp. 2-21, 402-475, 500-559 (1990).

Kai Hwang & Fayé A. Briggs, *Computer Architecture and Parallel Processing*, McGraw-Hill, Inc., pp. 52-141 (1984).

*Computer Engineering Handbook*, ed. C. H. Chen, McGraw-Hill, Inc., pp. 5.4-5.9, 5.20-5.23 (1992).

V. Carl Hamacher, Zvonko G. Vranesic & Safwat G. Zaky, *Computer Organization*, McGraw-Hill, Inc., pp. 286-293 (1978).

Winn L. Rosch, *Winn L. Rosch Hardware Bible, Premier Edition*, Sams Publishing, pp. 154-193, 366-402, 483-540, 565-602 (1997).

Harold Lorin, *Introduction to Computer Architecture and Organization*, John Wiley & Sons, Inc., pp. 119-146, 173-179, 251-270 (1982).

Windsor H. Hsu & Alan Jay Smith, "The Real Effect of I/O Optimizations and Disk Improvements", UC-Berkeley Technical Report No. UCB/CSD-03-1263, 57 pp. (Jul. 2003).

Windsor W. Hsu, Alan Jay Smith & Honesty C. Young, "The Automatic Improvement of Locality in Storage Systems", UC-Berkeley Technical Report No. UCB/CSD-03-1264, 43 pp. (Jul. 2003).

Rick Coulson, "Intel's Application Launch Accelerator Technology Loads Software 3X Faster," *Intel Platform Solutions News*, 4 pp. (Dec. 1997).

John Ousterhout & Fred Douglis, "Beating the I/O Bottleneck: A Case for Log-Structured File Systems," UC-Berkeley Technical Report No. UCB/CSD-88-467, 18 pp. (1988).

Mendel Rosenblum & John K. Ousterhout, "The Design and Implementation of a Log-Structured File System," *Proc. 13th ACM Symposium on Operating Systems Principles*, 15 pp. (1991-1992).

Mark Russinovich & David Solomon, "Windows XP: Kernel Improvements Create a More Robust, Powerful, and Scalable OS," *MSDN Magazine*, 23 pp. (Dec. 2001) [Downloaded from the World Wide Web on Dec. 15, 2004].

\* cited by examiner

Software 180 implementing adaptive disk layout tools

Figure 7

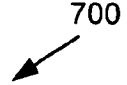

| Task No. | Task Name | Duration (min) | Page faults/sec (128MB memory) | Task description |
|---|---|---|---|---|
| 1 | pagliachi | 5 | 92 | Listen to audio CD |
| 2 | walküre | 5 | 230 | Listen to .wma file |
| 3 | resnet | 5 | 268 | Watch talking head video online |
| 4 | vc | 5 | 448 | Compile and debug small C# application |
| 5 | windows | 60 | 87 | General Microsoft Windows use |
| 6 | word | 5 | 211 | Type simple document |
| 7 | ie | 5 | 140 | Web surfing |
| 8 | outlook | 5 | 147 | Delete old email |
| 9 | links | 5 | 412 | Play golf simulator |
| 10 | sync | 5 | 884 | Synchronize large application with code database |
| 11 | build | 5 | 1492 | Build large application |
| 12 | install | 5 | 1184 | Install Microsoft Encarta |
| 13 | update | 5 | 759 | Run Microsoft Windows update; install two updates |
| 14 | etrust | 15 | 366 | Scan disk for viruses |

ADAPTIVE DISK LAYOUT TECHNIQUES AND TOOLS

COPYRIGHT AUTHORIZATION

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

TECHNICAL FIELD

Techniques and tools for improving the efficiency of reading information from non-volatile storage are described. For example, an adaptive disk layout algorithm is used to sort information on a disk.

BACKGROUND

Computer systems use memory (such as random-access memory ["RAM"], dynamic random-access memory ["DRAM"], and flash memory) and nonvolatile storage devices (such as magnetic or optical disk drives) to store information. Disk storage is usually much slower than memory. Thus, disk input/output ["I/O"] operations (e.g., disk reads and writes) can be a speed bottleneck for response times in a computer system.

In general, a computer system with random-access memory and a hard disk drive will perform a task more quickly if the information the computer needs to perform the task can be stored in memory. The more times a computer has to access information stored on a disk drive to perform a task, the slower its performance is likely to be. For example, hard disk drives with magnetic disks use disk arms and read heads to access information on the disks. Although the speed of disk arms and the rotational speed of disks have improved, disk drive mechanics remain a bottleneck for accessing information stored on the drive because the information capacities of disks have increased more rapidly. The greater speed of the disk arms and read heads has been countered by the increasing amount of information that they are required to cover.

Other forms of nonvolatile storage (e.g., tape drives, CD-ROM drives, CD-RW drives, and DVD drives) have different physical characteristics but often face similar challenges in terms of response times. For example, in a CD or DVD drive, a laser beam must be directed to different locations to read the information stored on the disk. The time it takes to position the laser beam to read the desired information is often slow when compared to response times for accessing information in volatile memory.

One way to increase system speed is to increase memory size. In volatile memory such as RAM or DRAM, information is not stored permanently. Information in volatile memory is overwritten as needed to accommodate the tasks that the system is currently performing. With increased memory, more information can remain accessible without performing disk reads. However, due to cost constraints, the amount of available volatile memory in a computer system is generally much smaller than the available disk storage. In addition, information in volatile memory can be lost completely when the flow of electrical power to the computer system is stopped.

Because it is generally not practical or desirable to rely exclusively on increases in volatile memory to increase system speed, several attempts have been made to optimize disk I/O operations. Some approaches to disk I/O optimization try to reduce the total number of disk I/O operations. Such approaches include caching, prefetching, write buffering, and request scheduling. In read caching, data that has been requested is read from a disk and temporarily stored in cache memory, where it can be accessed quickly if another request is made for the same data. In prefetching, data on a disk that is likely to be needed in the future is read from the disk ahead of time, before it is actually needed. In write buffering, written data is temporarily held in memory before being written to disk in order to regulate the flow of disk writes, which tend to occur in bursts. In request scheduling, disk requests are queued and scheduled in order to reduce the average response time for each request (e.g., by making more efficient use of disk arm movements).

Other approaches attempt to reduce the response time needed for individual disk I/O operations (such as by reducing seek times). These approaches include disk defragmenting. In some defragmenting techniques, information on a disk is re-organized to close gaps on the disk that are left when data is deleted, leaving unused disk space interspersed with data that is still in use. Although such defragmenting techniques can reduce the area of the disk that needs to be searched, information that is needed for a task may still be scattered in different areas of a defragmented disk. In another approach, a disk is organized by ordering disk blocks used by certain software applications in order to improve load times for the applications. This approach improves performance at application start-up time, but it lacks the ability to perform other kinds of optimizations, such as when an application is running.

Whatever the benefits of previous techniques, they do not have the advantages of the following techniques and tools.

SUMMARY

In one aspect, in response to each of plural page faults in a computer system, a first copy of a requested virtual memory page that has been read from a disk or buffer is stored in memory. A second copy of the requested page is written to a sorted set of pages in non-volatile storage (e.g., a computer-readable disk). The sorted set has a sorted order based on a read order of the pages in the sorted set. The plural page faults can comprise soft page faults and hard page faults. When a page is first modified while in memory, or when a new data page in memory is first used, and no page fault occurs, a copy of the modified page or new data page also can be written to the sorted set. Writing a copy of a page to the sorted set can be limited to certain kinds of pages (e.g., data pages).

In response to a request for a previously sorted page in the sorted set, a block of pages can be read into memory, the block comprising a copy of the previously sorted page and a copy of at least one other page from the sorted set. Prior to the request for the previously sorted page, one or more temporary data pages can be deleted from the sorted set when they are no longer in use. A copy of the previously sorted page can be written back to the sorted set, resulting in a new sorted order. Or, writing the copy of the previously page back to the sorted set can be omitted, leaving the sorted order unchanged and reducing the number of disk writes during sorting.

In another aspect, for each of plural virtual memory pages, the page is retired from memory and a copy of the page is written to a sorted set of pages on a computer-readable disk. The sorted set of pages has a sorted order based on a retirement order of the plural pages.

In another aspect, in response to an access occurring within a first time window of one or more pages in memory, the accessed pages are marked for inclusion in a first phase group. At the end of the first time window, one or more pages not accessed within the first time window are marked for inclusion in a second phase group. A copy of each of the accessed pages and each of the not-accessed pages is written to a sorted set of pages on a disk. The sorted set of pages has a sorted order based on the first phase group and the second phase group.

The various techniques and tools can be used in combination or independently.

Additional features and advantages will be made apparent from the following detailed description that proceeds with reference to the accompanying drawings.

BRIEF DESCRIPTION OF THE DRAWINGS

FIG. 7 is a table showing benchmarks used to produce simulation results for several described implementations.

DETAILED DESCRIPTION

Described adaptive disk layout techniques and tools improve the speed and efficiency of accessing information from non-volatile storage such as magnetic disks. For example, an adaptive disk layout system sorts a disk according to an adaptive disk layout algorithm that writes data units (e.g., pages) back to a disk in a sorted order when the data units are read into memory. Various adaptive disk layout algorithms are described in detail below.

Implementations of the adaptive disk layout system take advantage of the fact that it is inexpensive in terms of system latency time to read in additional data units that are sequentially placed on the disk. For example, with the disk in a sorted order, a read of a group of sequentially placed pages that includes a requested page is more likely to include other pages that will be used while they are in memory. "Hits" on other pages in the group can improve system performance by making one or more additional read operations unnecessary.

Various alternatives to the implementations described herein are possible. For example, techniques described with reference to flowchart diagrams can be altered by changing the ordering of stages shown in the flowcharts, by repeating or omitting certain stages, etc. As another example, although many of the techniques described herein refer to data units such as pages and blocks, other data units such as bits, bytes, words, segments, and the like can be used. As another example, although many of the techniques described herein refer to sorting data units on disks, sorting also can be performed on other forms of storage.

The various techniques and tools can be used in combination or independently. Different embodiments implement one or more of the described techniques and tools.

I. Computing Environment

Figure 1:
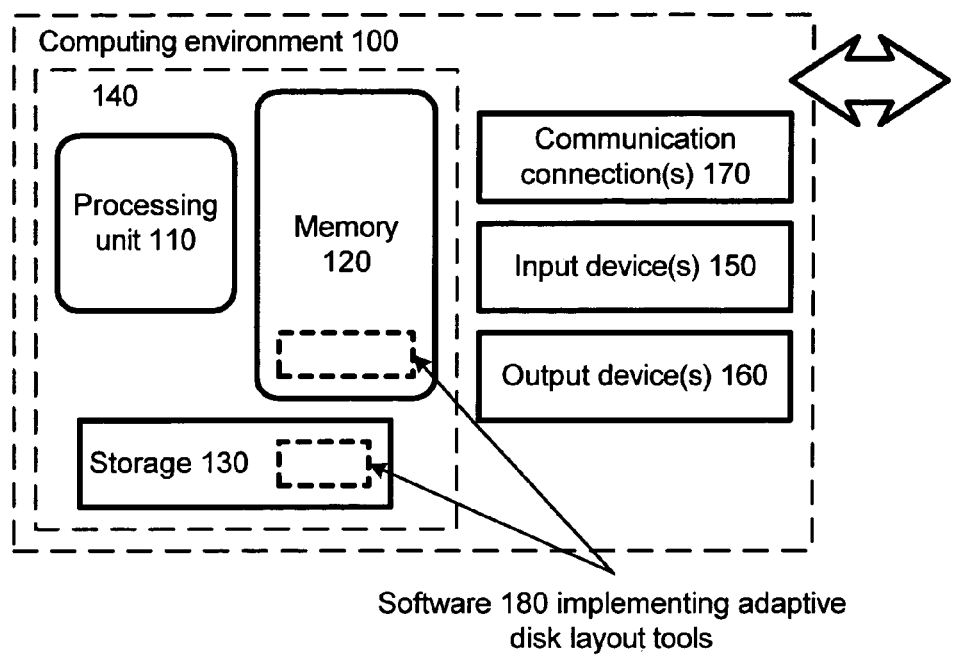
FIG. 1 is a block diagram of a suitable computing environment in conjunction with which several described embodiments may be implemented.

FIG. 1 illustrates a generalized example of a suitable computing environment 100 in which several of the described embodiments may be implemented. The computing environment 100 is not intended to suggest any limitation as to scope of use or functionality, as the techniques and tools may be implemented in diverse general-purpose or special-purpose computing environments.

With reference to FIG. 1, the computing environment 100 includes at least one processing unit 110, memory 120 and storage 130. In FIG. 1, this most basic configuration 140 is included within a dashed line. The processing unit 110 executes computer-executable instructions and may be a real or a virtual processor. In a multi-processing system, multiple processing units execute computer-executable instructions to increase processing power. The memory 120 may be volatile memory (e.g., registers, cache, RAM), non-volatile memory (e.g., ROM, EEPROM, flash memory, etc.), or some combination of the two. The storage 130 may be removable or non-removable, and includes magnetic disks, magnetic tapes or cassettes, CD-ROMs, CD-RWs, DVDs, or any other medium which can be used to store information and which can be accessed within the computing environment 100. In some implementations, the memory 120 and/or storage 130 stores software 180 implementing adaptive disk layout tools.

A computing environment may have additional features. For example, the computing environment 100 may include one or more input devices 150, one or more output devices 160, and one or more communication connections 170. An interconnection mechanism (not shown) such as a bus, controller, or network interconnects the components of the computing environment 100. Typically, operating system software (not shown) provides an operating environment for other software executing in the computing environment 100, and coordinates activities of the components of the computing environment 100.

The input device(s) 150 may be a touch input device such as a keyboard, mouse, pen, or trackball, a voice input device, a scanning device, sound card, video card, TV tuner card, or similar device that accepts audio or video input in analog or digital form, or a CD-ROM or CD-RW or another device that provides input to the computing environment 100. The output device(s) 160 may be a display, printer, speaker, CD-writer, or another device that provides output from the computing environment 100.

The communication connection(s) 170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment 100, computer-readable media include memory 120, storage 140, communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "sort" and "organize" to describe computer operations in a computing environment. These terms are high-level abstractions for operations performed by a computer, and should not be confused with acts performed by a human being. The actual computer operations corresponding to these terms vary depending on implementation.

II. Adaptive Disk Layout Techniques and Tools

The described techniques and tools improve the speed and efficiency of accessing information from non-volatile storage such as magnetic disks. For example, an adaptive disk layout system sorts a disk according to an adaptive disk layout algorithm. Various adaptive disk layout techniques are described in detail below.

A. Overview

Disk reads and writes are expensive operations in terms of system latency time. Because of their high bandwidth, high data density, and poor random access times compared to random access memory, disk I/O is a speed bottleneck for most computer systems. When program code or data needed by a CPU is not available in memory, the information needs to be brought in from another location (typically a disk). For a magnetic media disk, this is usually a very slow process because access to the disk involves a mechanical movement of the disk and read head.

Described implementations of the adaptive disk layout system address such problems by sorting the information on the disk. For example, an adaptive disk layout system sorts the disk according to an adaptive disk layout algorithm that writes pages of data back to the disk based on the order that the pages were requested from the disk.

A "page" is a unit of virtual memory. If a process is seeking a particular page, it will check records of the contents of memory to see if the data corresponding to the page it is seeking is stored in memory. A "page fault" occurs when a page that is not present in memory is requested by a processor. Page faults can be classified as soft page faults and hard page faults. When a soft page fault occurs, the data for the requested page is retrieved from a buffer. When a hard page fault occurs, the data for the requested page is retrieved from a storage device outside of memory (e.g., a disk). Typically, the requested page is included in a block of several pages that are read from the disk at one time.

At this point, a memory overwrite may occur in which the pages in the block are swapped with other pages in memory. A record of pages in memory is updated to indicate the presence of the requested pages and the new location of any pages that may have been overwritten. Different algorithms may be used to determine which pages to overwrite. Typically, the least recently used pages are swapped out of memory. The swapped-out pages are then stored on the disk if they have been modified.

Figure 2:
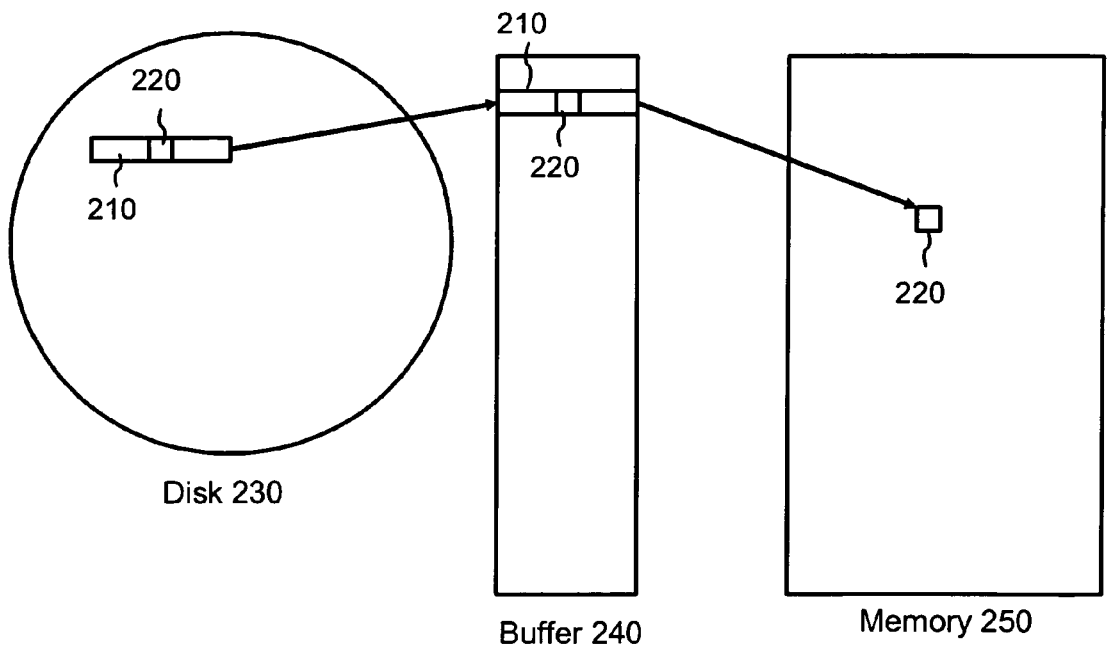
FIG. 2 is a block diagram of a simplified disk/memory system showing a response to a page request resulting in a page fault.

FIG. 2 is a diagram of a simplified disk/memory system that shows an example of a response to a page request that has resulted in a page fault. Block 210 includes data for a requested page 220 stored on disk 230. In response to a page fault, block 210 including requested page 220 is read into a buffer 240 (also known as a standby list). From the buffer 240, the required page 220 is read into memory 250. Although FIG. 2 shows movement of requested page 220 from disk 230 to buffer 240 and memory 250, such operations may comprise transfers of copies of the data in question. In other words, copies of the requested data may remain at lower levels in the memory hierarchy (e.g., on disk) after the data has been transferred from disk to memory.

B. Adaptive Disk Layout Algorithms

In this section, several examples of adaptive disk layout algorithms, or sorting algorithms, are described. The different sorting algorithms are used to sort stored information in storage devices. The sorted information can include program code, program data, or a combination of code and data. Although specific examples are described, the algorithms can be altered (such as by repeating, omitting, or changing certain steps within an algorithm) or used in different ways.

1. Continuous Sorting Algorithms

In a continuous sorting algorithm, every time a certain page event (e.g., a page read, overwriting of a page, etc.) occurs, the page is written to the disk in a sorted order. Different kinds of continuous sorting algorithms can be used, such as read order and retirement order algorithms.

In a read-order continuous sorting algorithm, each time a read from the disk occurs, the page is rewritten to the disk based on the order the page was read. In one implementation of a read-order continuous sorting algorithm, the page is rewritten to the disk at the front of a queue. A requested page is read in along with the pages that are adjacent to them in the queue, or, if the sorted order queue is not long enough, whatever pages occupy the corresponding space on the disk. In this example, with a 32-page block size, 31 other pages are read in along with the requested page.

Figure 3:
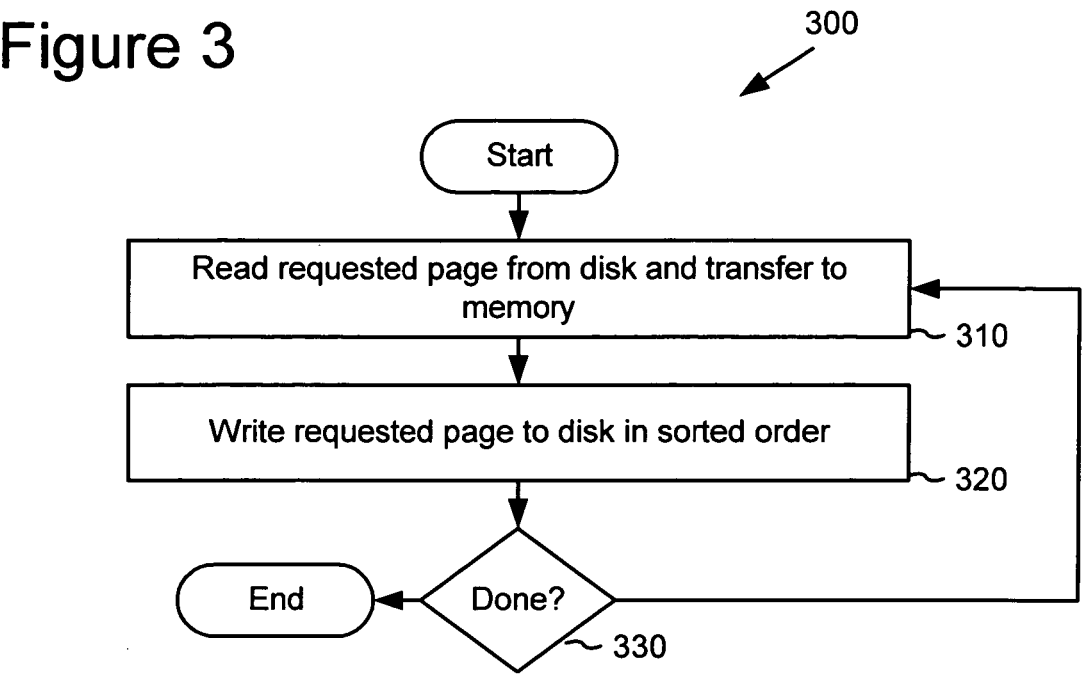
FIG. 3 is a flow chart showing a technique for performing a continuous sorting algorithm.

For example, in a fault sequence A-B-C-D-B, five page faults occur. Page A is requested to be read from a disk, followed by a request for page B, and so on. After the first four faults of the fault sequence, the sorted page order on the disk is A, B, C, D. On the fifth page fault, page B is read in from the disk along with the pages in the block that follow 'B', beginning with C and D, which immediately follow 'B' in the sorted order. On the disk, the previous copy of page B is deleted and replaced with a new copy, resulting in the following sorted page order: A, C, D, B FIG. 3 is a flow chart showing a technique 300 for performing a read-order continuous sorting algorithm. First, at 310 a page is read from a disk and a copy of the page is transferred to memory. At 320, a copy of the page is written back to the disk in a sorted order. Although this flowchart shows that a copy of the requested page is written back to the disk immediately after the copy is transferred to memory, these events can occur at different times. For example, the write of the requested page back to the disk could be postponed until later. At 330, if all page reads are done, the process ends. Otherwise, the next page is read from disk and written back to the disk in the sorted order. The continuous sorting algorithm performs a write back to the disk in sorted order for each page fault, including faults on pages on disk (hard page faults) and pages found in the buffer (soft page faults). In addition, an algorithm may perform a write for new data (e.g., data that is first entered by a user, instead of being read from the disk) in order to add the new data to the disk in sorted order, even though the newly added data did not cause a page fault.

One benefit of read-order sorting algorithms is that different information that has been read at approximately the same time will be placed in close proximity on the disk. This can streamline future disk reads because the blocks of pages being read in to memory will be more likely to contain pages that will be used before being overwritten.

In a retirement order continuous sorting algorithm, sorting is based on the order the pages "retire" from (i.e., are overwritten in) memory. For example, if page A is retired from memory, page A is written to disk in a sorted order. If page B is retired from memory immediately after page A, page B is also written to disk and follows page A in the sorted order.

Figure 4:
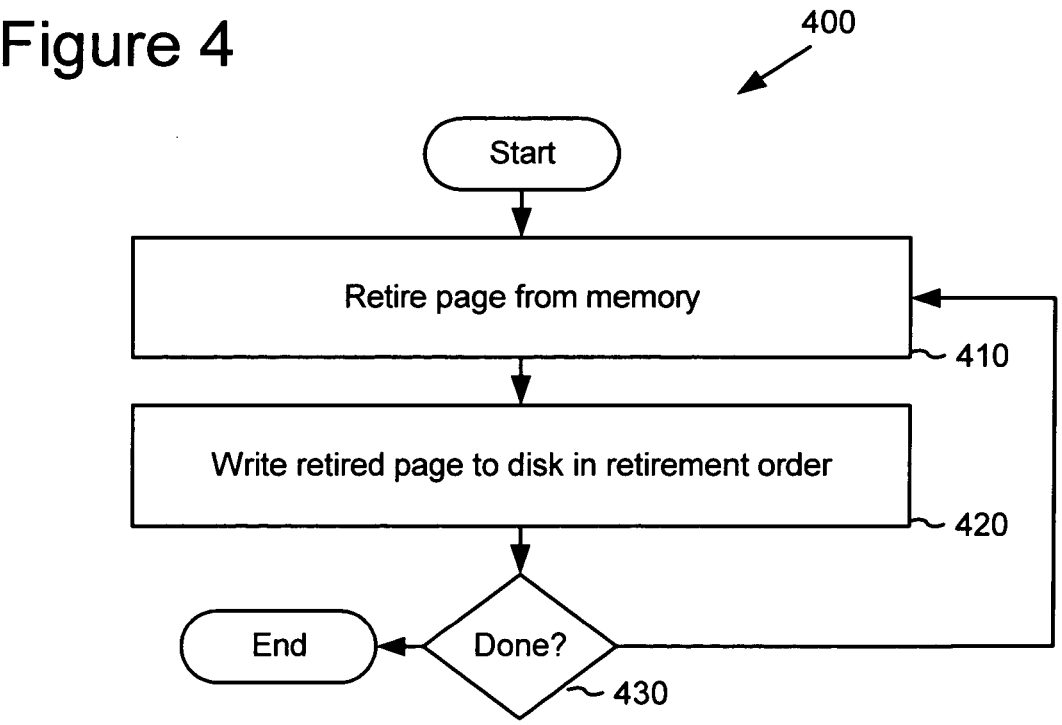
FIG. 4 is a flow chart showing a technique for performing a retirement-order continuous sorting algorithm.

FIG. 4 is a flow chart showing a technique 400 for performing a retirement-order continuous sorting algorithm. At 410, a page is retired from memory. At 420 the retired page is written to a disk in retirement order. At 430, if all page retirements are done, the process ends. Otherwise, when the next page is retired from memory, it is written to the disk in retirement order. The retirement-order continuous sorting algorithm performs a write to disk in retirement order for each retired page.

One benefit of retirement order sorting algorithms is that disk writes can be deferred to a later time compared to read order algorithms. This can be helpful, for example, when pages have been modified while they are in memory and would need to be written back to disk when they are retired anyway.

In a "sort-once" sorting algorithm, sorting is performed continuously, except that sorting is performed no more than once for each page. For example, if page "A" has already been written to disk in sorted order, the "sort-once" continuous sorting algorithm does not re-sort page "A" on a subsequent page fault and request for page "A." The sort-once policy can apply to a limited time window (e.g., one sort per page per hour, one sort per page per day, etc.). If the sort-once policy is limited to a particular time window, then the sort-once sorting algorithm does not re-sort page "A" in that time window.

Alternatively, continuous sorting algorithms sort data on the disk based on some other ordering or sorting criteria.

2. Non-Continuous Sorting Algorithms

As mentioned above, in a continuous sorting algorithm a page is written to disk in a sorted order every time a certain page event (e.g., a page read, overwriting of a page, etc.) occurs. Non-continuous sorting algorithms do not perform a write to disk for each occurrence of a given page event. Instead, non-continuous sorting algorithms perform writes at specific times or periodically.

In one implementation, a periodic sorting algorithm sorts a disk periodically by writing pages in sorted order once per hour, once per day, etc. Alternative non-continuous sorting algorithms also can be used. For example, a non-continuous sorting algorithm may sort at irregular intervals or at predetermined times, or upon the occurrence of certain events (e.g., user input, etc.) or the fulfillment of certain conditions (e.g., when system conditions are such that it will be more efficient to perform a write to the disk). Non-continuous sorting algorithms also may batch groups of writes to be performed at a time that reduces system latency.

Non-continuous sorting algorithms can sort disks based on the order information is read from disk (e.g., page read order), the order that information is retired from memory (e.g., page retirement order), etc. Alternatively, non-continuous sorting algorithms sort data on the disk based on some other ordering or sorting criteria. Non-continuous sorting algorithms also can be used to sort subsets of information. For example, a non-continuous sorting algorithm can be used to sort pages of program data without sorting pages of program code.

Mark-and-split

A mark-and-split sorting algorithm is one example of a non-continuous sorting algorithm used in some implementations.

Figure 5:
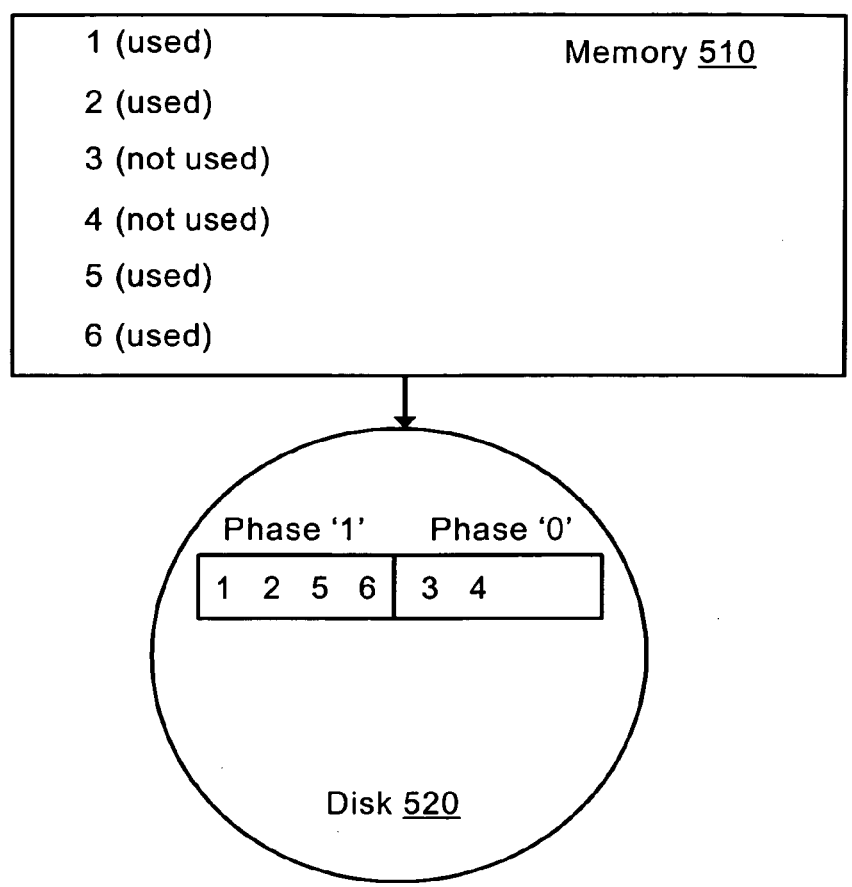
FIG. 5 is a block diagram of a simplified disk/memory system showing pages sorted into two phase groups for a single time window using a mark-and-split sorting algorithm.

FIG. 5 is a block diagram of a simplified disk/memory system that shows disk sorting according to a mark-and-split sorting algorithm. In FIG. 5, a set of pages in memory are numbered 1 through 6. The pages are marked as either "used," indicating that the page has been accessed since being brought into memory from the disk, or "not used," indicating that the page has not been accessed while in memory. This marking can be performed by the mark-and-split algorithm or independent of the algorithm. For example, computer systems typically have a mechanism for marking pages as having been accessed while they are in memory. In FIG. 5, pages 1, 2, 5, and 6 are marked "used," while pages 3 and 4 are marked "not used." The mark-and-split sorting algorithm stores the "used" and "not used" pages in different "phase" groups during disk sorting.

In the example shown in FIG. 5, the mark-and-split sorting algorithm determines whether the pages have been used or not used in a single time window, and only two phases are shown. The mark-and-split sorting algorithm writes the "used" and "not used" pages to disk 520, positioning "used" pages in one group (labeled "Phase 1") on the disk and "not used" pages in another group (labeled "Phase 0"). The ordering of pages within the "used" or "not used" sets is kept as it is. For example, as shown in FIG. 5, pages 1 and 2 are followed by pages 5 and 6 in memory 510. This ordering is preserved in the "Phase 1" group.

Figure 6:
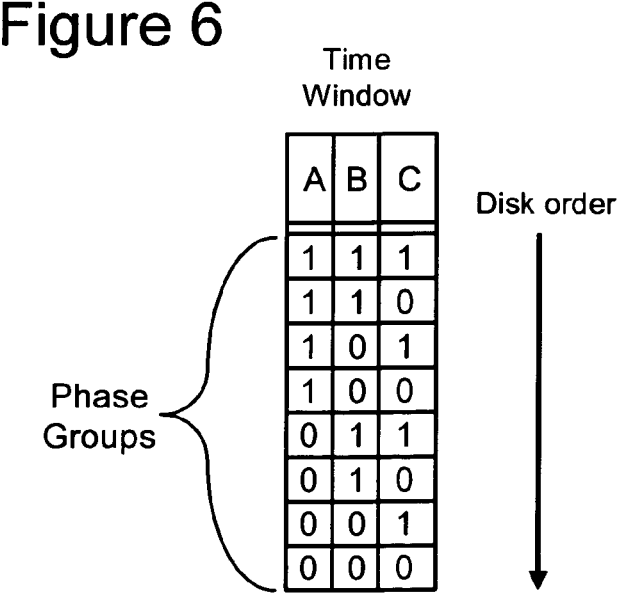
FIG. 6 is a diagram showing different phase groups for more than one time window.

In the example shown in FIG. 6, a mark-and-split algorithm continues to sort pages into phase groups after each of several time windows. In particular, FIG. 6 shows the ordering after three time windows (A, B and C) in which a page may be used or not used. After three mark and split operations have been performed, a page will be placed into one of eight phase groups. Any number of pages may belong to these phase groups. When a page that has been sorted into a mark-and-split sorted order is requested from the disk, the block of pages that is read into memory includes the requested page along with any pages that follow it in it own phase group, followed by any pages in any following phase groups, up to the number of pages in the block size. In the example shown in FIG. 6, the "disk order" that determines which pages are read in with the requested page is shown by the downward-pointing arrow.

Mark-and-split algorithms typically require fewer disk writes than continuous sorting algorithms because the writes are performed periodically. In addition, mark-and-split algorithms can simplify a sorting process by sorting pages by phase groups while maintaining the original ordering of the pages within each phase group. The time windows for mark-and-split algorithms can be any desired window of time, from one second or less to longer time windows such as minutes, hours, days, or more.

Mark-and-split algorithms also can be used to sort subsets of information. For example, a mark-and-split algorithm can be used to sort pages of program data without sorting pages of program code. Sorting only data pages can be beneficial, for example, in cases where program code pages are already efficiently arranged and re-sorting the program code pages is not necessary.

C. Simulation Results

The results of some experimental simulations for evaluating the performance of described sorting algorithms and are set forth below with reference to FIGS. 7-24. The simulation results described in this section include miss rate reduction results for various benchmarks and memory sizes. FIG. 7 is a table 700 showing benchmarks for the simulation results. Table 700 includes tasks performed on a computer for different lengths of time. A measured rate of page faults per second is shown for each task.

Most of the Figures described in this section compare miss rates in test runs that use a sorting algorithm with test runs that do not. Some of the Figures described in this section compare the relative performance of different sorting algorithms.

Some of the Figures also show the effects of one or more other simulation variables. For example, some of the Figures show simulation results in which "perfect prefetching" is used to simulate the effect that prefetching techniques may have on miss rate when used in combination with described adaptive disk layout algorithms. In these simulation results, "perfect prefetching" means that a series of pages that will be requested in the test run are read into memory from the disk ahead of time. The miss rate (not shown in these Figures) for the page requests covered by these prefetched pages is, therefore, 0. The miss rates that are shown for results that include "perfect prefetching" (abbreviated as "PP" in the Figures) are calculated beginning with the next page request after the last page request covered by a prefetched page.

As another example, some of the Figures show simulation results in which the disk is "warmed" by pre-sorting it in some way, such as by performing a warming run with one of the described sorting algorithms. In these simulation results, the "warm disk" label (abbreviated as "WD" in the Figures) is used to indicate the effect that prior sorting of the disk may have on the miss rate of an applied sorting algorithm. When using a sorting algorithm, it usually takes some time before the pages are sorted enough for best results. The "warm disk" plots give an indication of how much better performance will be after the disk has been sorted.

Alternatively, other adaptive disk layout algorithms can be used for sorting. Furthermore, other optimization techniques can be used can be used in combination with described adaptive disk layout algorithms (e.g., in place of or in addition to disk warming or prefetching).

Other simulation variables and specifics relating to the simulation results are described below with reference to the corresponding Figures.

Unless otherwise noted, the simulation results shown in the Figures discussed below assume a page size of 4 KB, a block size of 32 pages, and a buffer that occupies 1/16 of the indicated memory size. However, other page, block, and buffer sizes can be used. Page, block, buffer and memory sizes (as well as other system characteristics) can vary depending on the requirements or capabilities of different computer systems, and in some cases can be adjusted by a user or system designer.

1. Continuous Sorting Sinulation Results In the graph shown in FIG. 8, the average miss rates in different contexts (e.g., fetch aligned (labeled "FA" in FIG. 8), fetch sorted (labeled "FS" in FIG. 8) and fetch sorted, warm disk (labeled "FSWD" in FIG. 8)) are shown for all benchmark tasks, with results plotted for different block sizes (which are shown in a logarithmic scale).

The "fetch aligned" plot line is used as a point of reference for the simulated results of the sorting algorithm. In the "fetch aligned" technique, for a block having a size of n pages, a requested page is included in a fetched block aligned on an n-page boundary to avoid gaps of unfetched pages, with no disk sorting performed. The "fetch sorted" plot line indicates the average miss rate for a system using a read-order continuous sorting algorithm. The "fetch sorted, warm disk" plot line indicates the average miss rate where the disk has been sorted according to a read-order continuous sorting algorithm and the disk has been "warmed" by running the read-order continuous sorting algorithm on the disk prior to testing.

Figure 8:
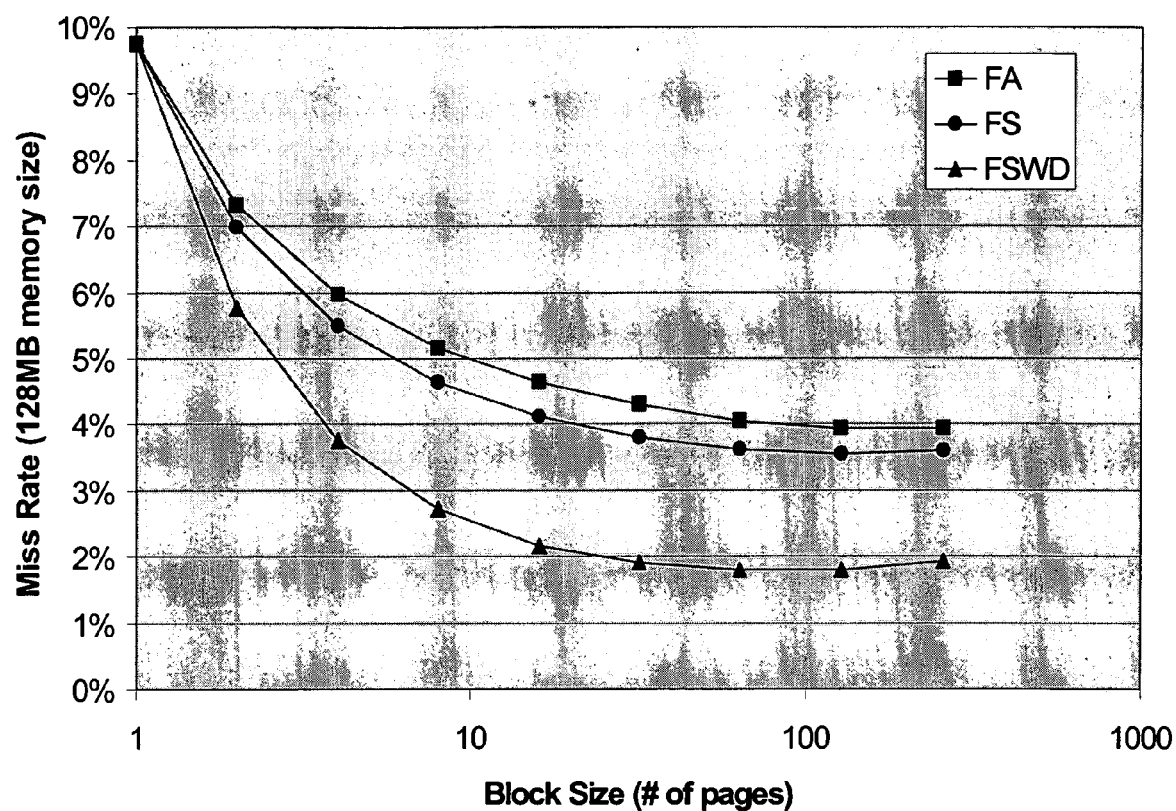
FIG. 8 is a graph showing simulated miss rates for all benchmark tasks shown in FIG. 7 plotted as a function of block size in fetch aligned, fetch sorted, and fetch sorted, warm disk contexts.

As shown in FIG. 8, sorting the disk according to a read-order continuous sorting algorithm provides a benefit in terms of miss rate, especially in a "warm disk" context. In this example, the disk has been warmed by running the read-order continuous sorting algorithm on the disk before running the miss rate test. Although the "warm disk" reduction in miss rate shown in this Figure is optimistic when compared with realistic disk conditions, FIG. 8 shows that running a read-order continuous sorting algorithm on a pre-sorted disk can have additional benefits.

In the graph shown in FIG. 9, average miss rates for all benchmark tasks are plotted for different buffer sizes (which are shown in a logarithmic scale) in the contexts described with reference to FIG. 8. The average miss rates are plotted as a function of the denominator of the ratio of buffer size to memory size. Thus, the ratio ranges from 1/1 (i.e., buffer size occupies all of the memory size) at the left edge of the graph to 1/100 (i.e., buffer size occupies 1/100 of the memory size) at the right edge of the graph. In this example, the memory size is assumed to be 128 megabytes.

Figure 9:
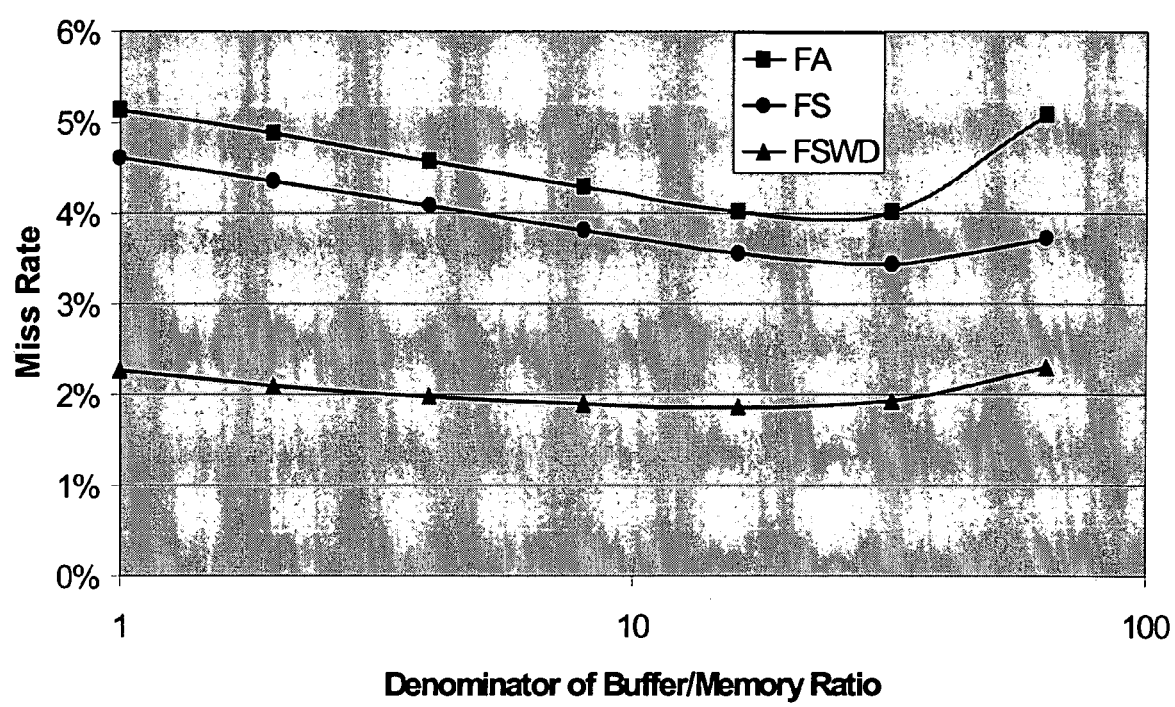
FIG. 9 is a graph showing simulated miss rates for all benchmark tasks shown in FIG. 7 plotted as a function of buffer size in fetch aligned, fetch sorted, and fetch sorted, warm disk contexts.

As shown in FIG. 9, sorting the disk according to a read-order continuous sorting adaptive disk layout algorithm provides a benefit in terms of miss rate for a range of buffer sizes. Miss rates decrease as the ratio of buffer size to memory size decreases from 1/1, and then increases as the ratio approaches 1/100.

Figure 10:
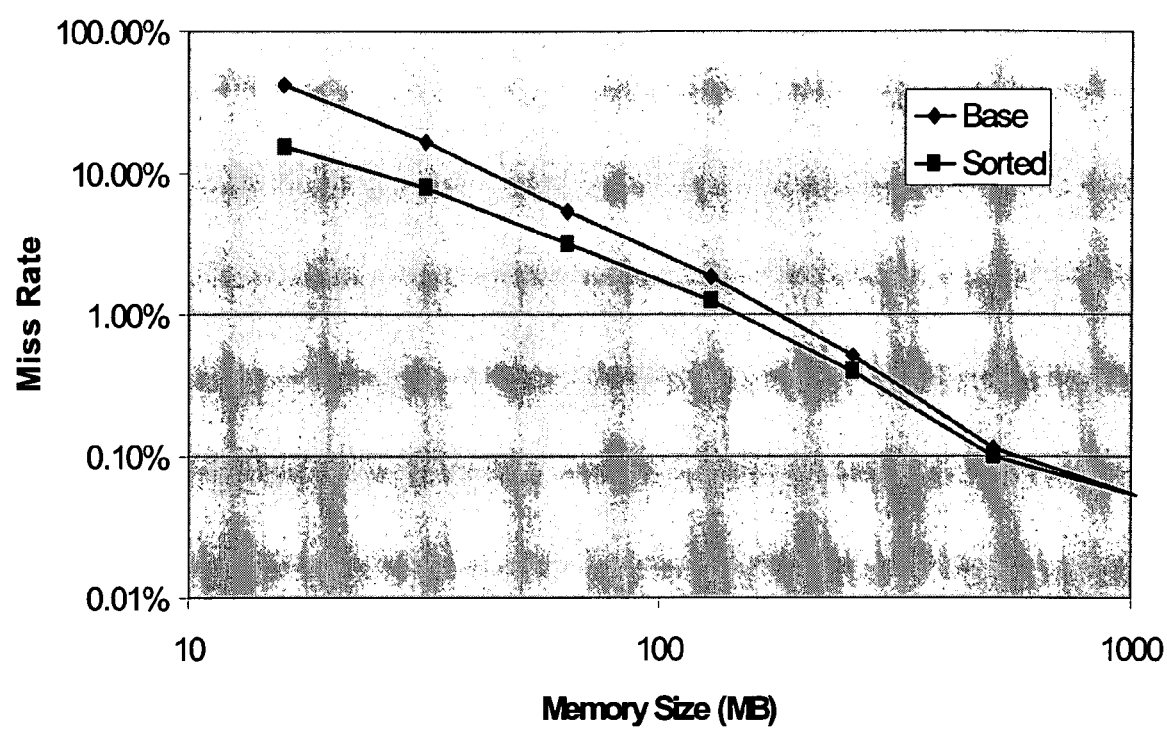
FIG. 10 is a graph showing simulated miss rates plotted as a function of memory size for a disk sorted using a continuous sorting algorithm.
Figure 11:
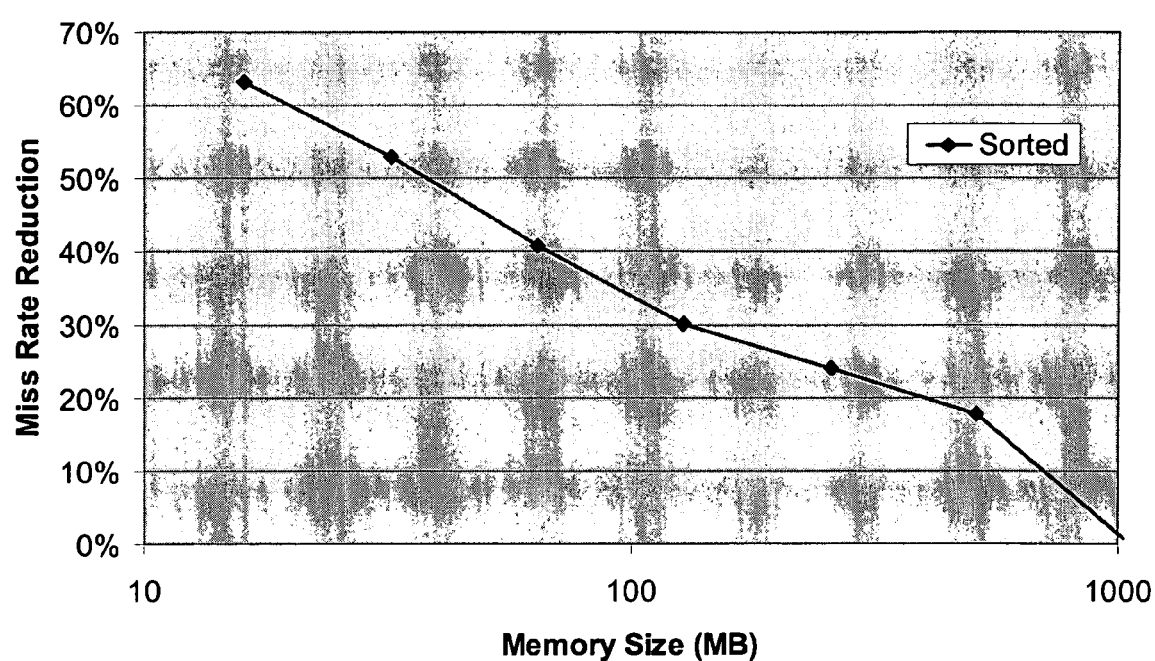
FIG. 11 is a graph showing the percentage reduction of simulated miss rates in FIG. 10 for the continuous sorting algorithm.

The graph in FIG. 10 shows miss rates for a disk sorted using a read-order continuous sorting algorithm (represented by the "Sorted" plot line) compared with miss rates for an unsorted disk (represented by the "Base" plot line), assuming a block size of 32 pages and a buffer that occupies 1/16 of the memory size. The miss rates are plotted as a function of memory size. (The memory size axis is shown in a logarithmic scale.) Both the "Sorted" and "Base" miss rates decline as memory size increases. However, with a read-order continuous sorting algorithm the miss rates are lower, especially at lower memory sizes. The graph shown in FIG. 11 plots the percentage reduction of miss rates in FIG. 10 for the read-order continuous sorting algorithm. FIG. 11 shows that miss rate reductions of over 60% can be achieved for memory sizes below 100 megabytes.

Read-order Continuous Sorting, First Data Reference Free

Figure 12:
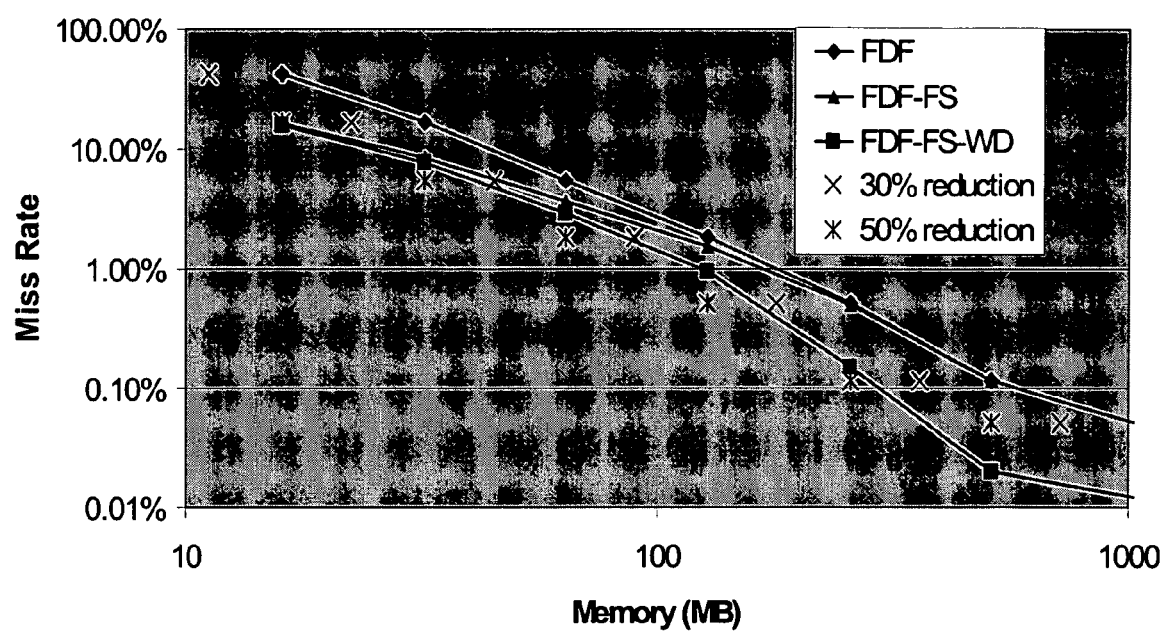
FIG. 12 is a graph showing simulated miss rates for a continuous sorting algorithm in a first data reference free context.

In the graph shown in FIG. 12, the base plot line is "first data reference free" (labeled "FDF"). FDF indicates that when a new data page is first accessed (e.g., when a user inputs new data while running an application) no page fault occurs. However, code pages still incur a fault on first use. In this base plot line, no sorting is performed. The "first data reference free, fetch sorted" plot line (labeled "FDF-FS") shows miss rates for a read-order continuous sorting algorithm. The "first data reference free, fetch sorted, warm disk" plot line (labeled "FDF-FS-WD") shows miss rates for a read-order continuous sorting algorithm on a pre-warmed disk. The miss rates are plotted as a function of memory size, shown in a logarithmic scale. Reference points for 30% and 50% reductions in miss rate also are shown in this Figure.

As shown in FIG. 12, sorting the disk according to a read-order continuous sorting algorithm provides a benefit in terms of miss rate, especially in a "warm disk" context, when compared to the "FDF" plot line. In this example, the disk has been warmed by running the read-order continuous sorting algorithm on the disk before running the miss rate test. Although the "warm disk" reduction in miss rate shown in this Figure is optimistic when compared with realistic disk conditions, FIG. 12 shows that running a read-order continuous sorting algorithm on a pre-sorted disk can have additional benefits.

Figure 13:
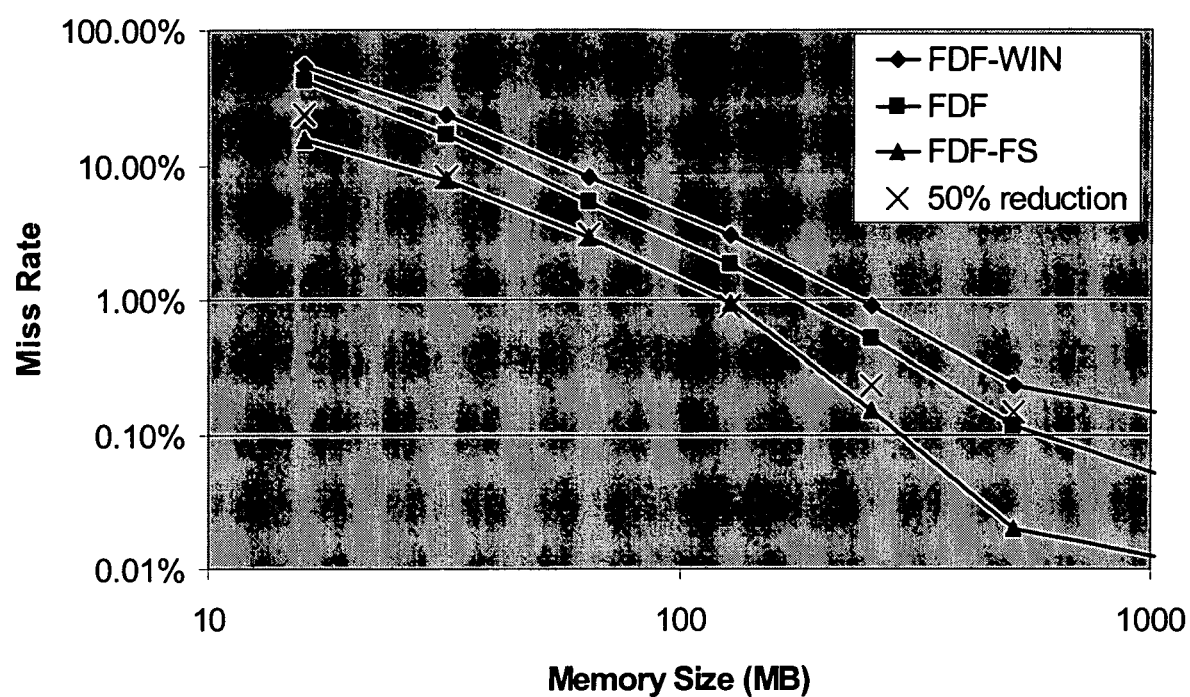
FIG. 13 is a graph showing simulated miss rates for a continuous sorting algorithm and a 32-page block size compared with miss rates for default block sizes in a Microsoft Windows operating system and miss rates for a 32-page block size without continuous sorting.

In the graph shown in FIG. 13, simulated results of using a read-order continuous sorting algorithm and a 32-page block size are compared with other block sizes commonly used in Microsoft Windows operating systems. Along with the base plot line "FDF" is a plot line labeled "FDF-WIN." This plot line shows simulated results in an FDF context with an 8-page block size for program code and a 2-page block-size for program data. In the "FDF" and "FDF-WIN" plot lines, no sorting is performed. The "FDF-FS" plot line shows miss rates for a read-order continuous sorting algorithm. The miss rates are plotted as a function of memory size, with both miss rate percentages and memory sizes shown in a logarithmic scale. Reference points for 50% reductions in miss rate also are shown in this Figure.

As shown in FIG. 13, sorting the disk according to a read-order continuous sorting algorithm provides a benefit in terms of reduced miss rate.

Read-order Continuous Sorting, Once Per Page

Figure 14:
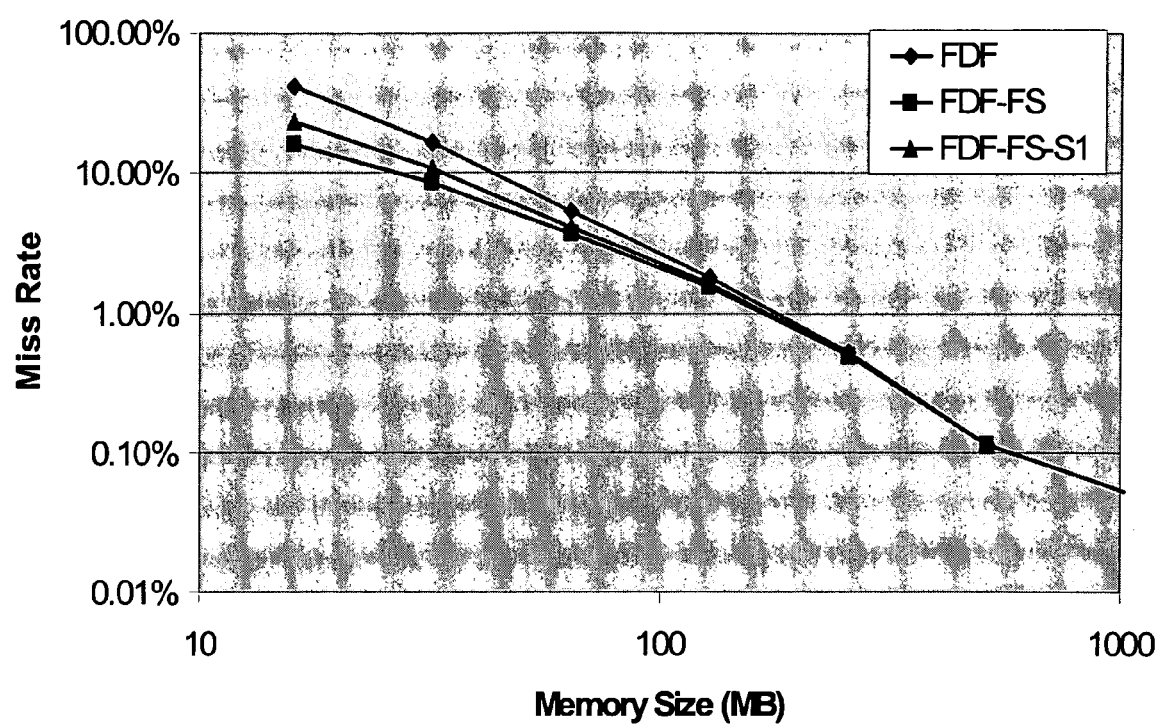
FIG. 14 is a graph showing simulated results for a "sort-once" sorting algorithm.

In the graph shown in FIG. 14, simulated results of using a read-order continuous sorting algorithm are compared with a "sort-once" read-order sorting algorithm. In a sort-once algorithm, each page is sorted no more than once (e.g., in a given time period). In the example shown in FIG. 14, if a page has already been written to the disk in sorted order, the sort-once algorithm does not re-sort the page on a subsequent page fault and request for the page.

In the "FDF" plot line, no sorting is performed. The "FDF-FS" plot line shows miss rates for a read-order continuous sorting algorithm, and the "FDF-FS-S1" shows miss rates for a sort-once read-order sorting algorithm. The miss rates are plotted as a function of memory size, with both miss rate percentages and memory sizes shown in a logarithmic scale.

As shown in FIG. 14, most of the reduction in miss rate provided by sorting the disk according to a read-order continuous sorting algorithm can be achieved by sorting once per page, allowing an option of reducing the number of disk writes.

Read-order Continuous Sorting, Data vs. Code

Figure 15:
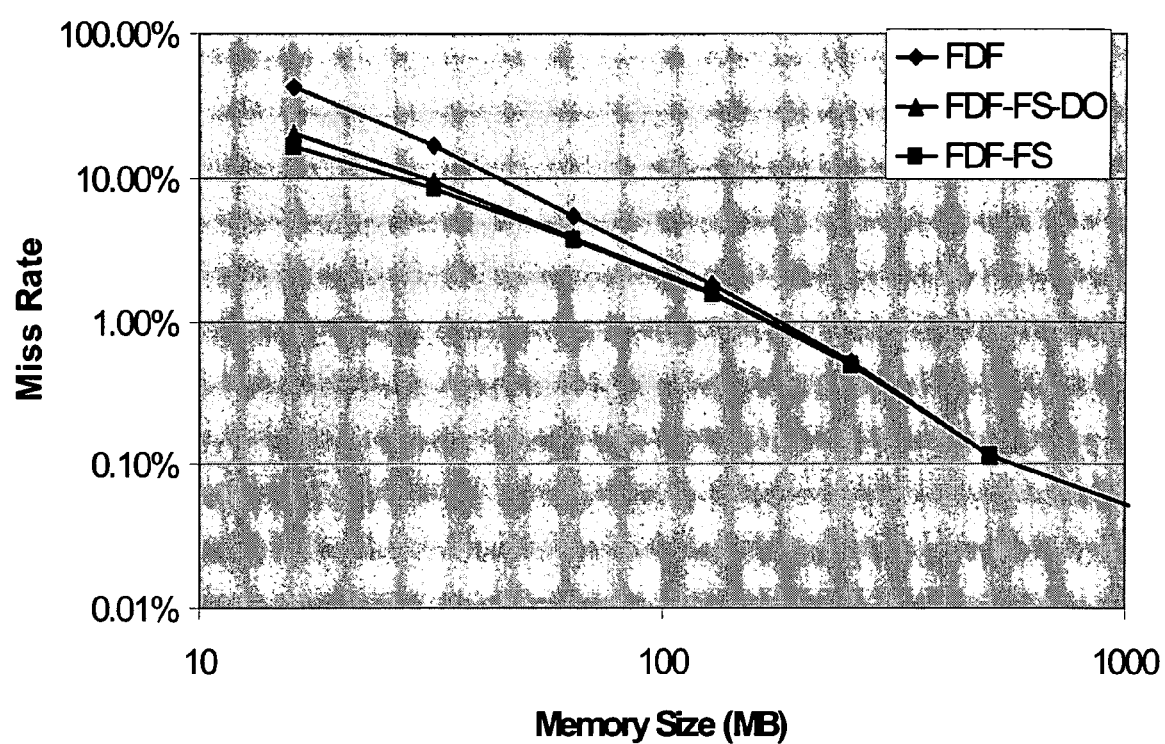
FIG. 15 is a graph showing simulated results for using a continuous sorting algorithm on both program code and program data, compared with simulated results of using a continuous sorting algorithm on program data only.

In the graph shown in FIG. 15, simulated results of using a read-order continuous sorting algorithm on both program code pages and program data pages are compared with simulated results of using a read-order continuous sorting algorithm on program data only. The plot line labeled "FDF-FS" shows miss rates for sorting program code and program data using a read-order continuous sorting algorithm, and the plot line labeled "FDF-FS-DO" shows miss rates for sorting program data only using a read-order continuous sorting algorithm. The miss rates are plotted as a function of memory size, with both miss rate percentages and memory sizes shown in a logarithmic scale.

Figure 16:
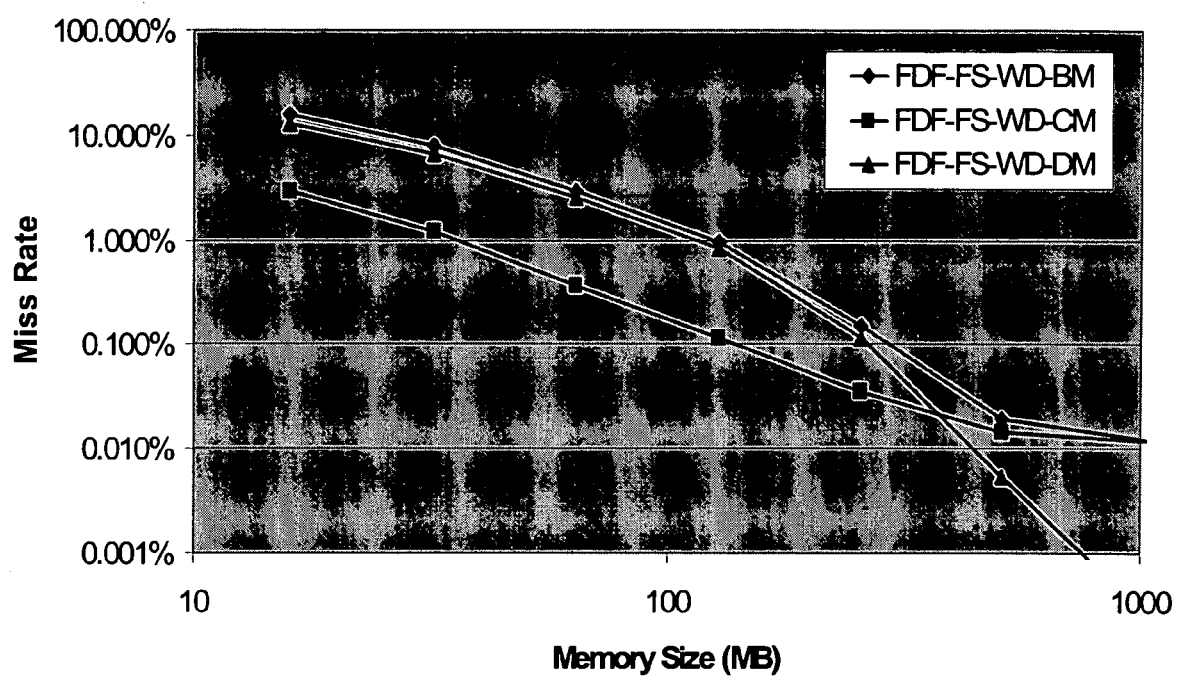
FIG. 16 is a graph showing a breakdown of program code page misses and program data page misses in simulated results for using a continuous sorting algorithm on a warm disk to sort both program code pages and program data pages.

As shown in FIG. 15, most of the reduction in miss rate provided by sorting the disk according to a read-order continuous sorting algorithm can be achieved by sorting only program data pages, allowing an option of omitting sorting of program code pages. For example, FIG. 16 shows a breakdown of program code page misses and program data page misses in simulated results of using a read-order continuous sorting algorithm on a warm disk to sort both program code pages and program data pages. The plot line labeled "FDF-FS-WD-BM" shows miss rates for both program code and program data pages, the plot line labeled "FDF-FS-WD-CM" shows miss rates for program code only, and the plot line labeled "FDF-FS-WD-DM" shows miss rates for program data only. The miss rates are plotted as a function of memory size, with both miss rate percentages and memory sizes shown in a logarithmic scale. As shown in FIG. 16, most of the page faults are caused by data misses.

Read-order Continuous Sorting with Prefetching

Figure 17:
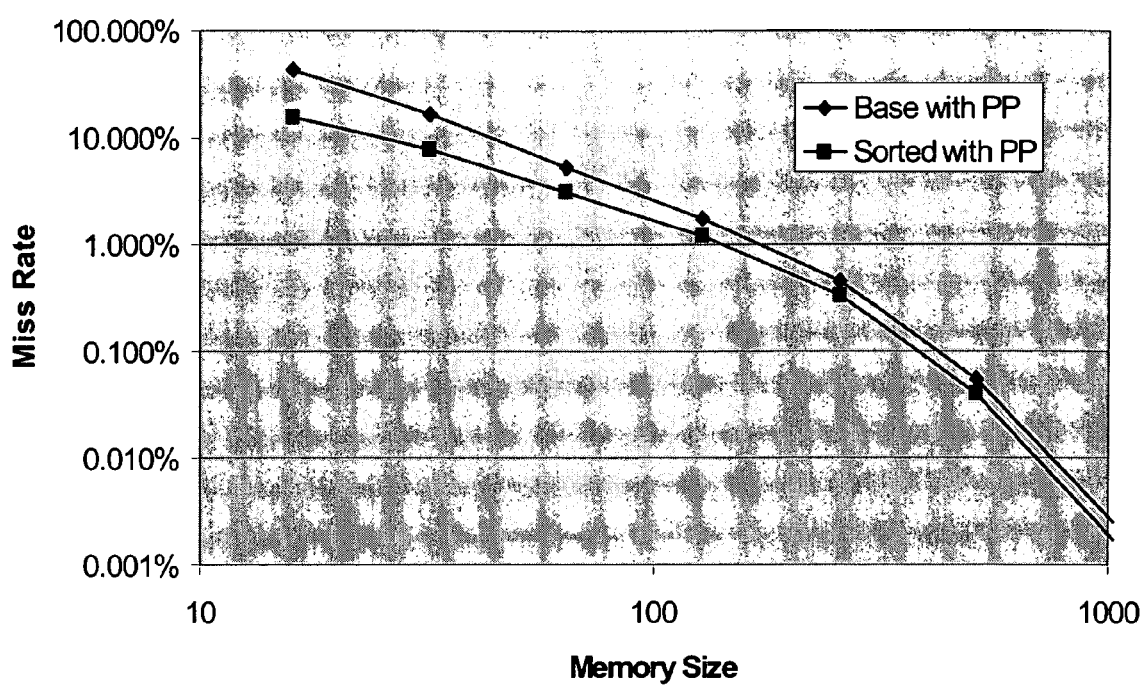
FIGS. 17 and 18 are graphs showing simulated miss rates plotted as a function of memory size for a disk sorted using a continuous sorting algorithm and prefetching.

The graph in FIG. 17 shows miss rates for a disk sorted using a read-order continuous sorting algorithm (represented by the "Sorted with PP" plot line) compared with miss rates for an unsorted disk (represented by the "Base with PP" plot line). The miss rates are plotted as a function of memory size, shown in a logarithmic scale.

For both the "Sorted with PP" and "Base with PP" plot lines, simulated "perfect" prefetching has been used. Both miss rates decline as memory size increases. However, with the read-order continuous sorting algorithm, the miss rates are lower, indicating that the sorting algorithm provides a reduction in miss rate in addition to miss rate reductions provided by prefetching. As shown in FIG. 17, the reduction in miss rate provided by the read-order continuous sorting algorithm is more pronounced at lower memory sizes.

Figure 18:
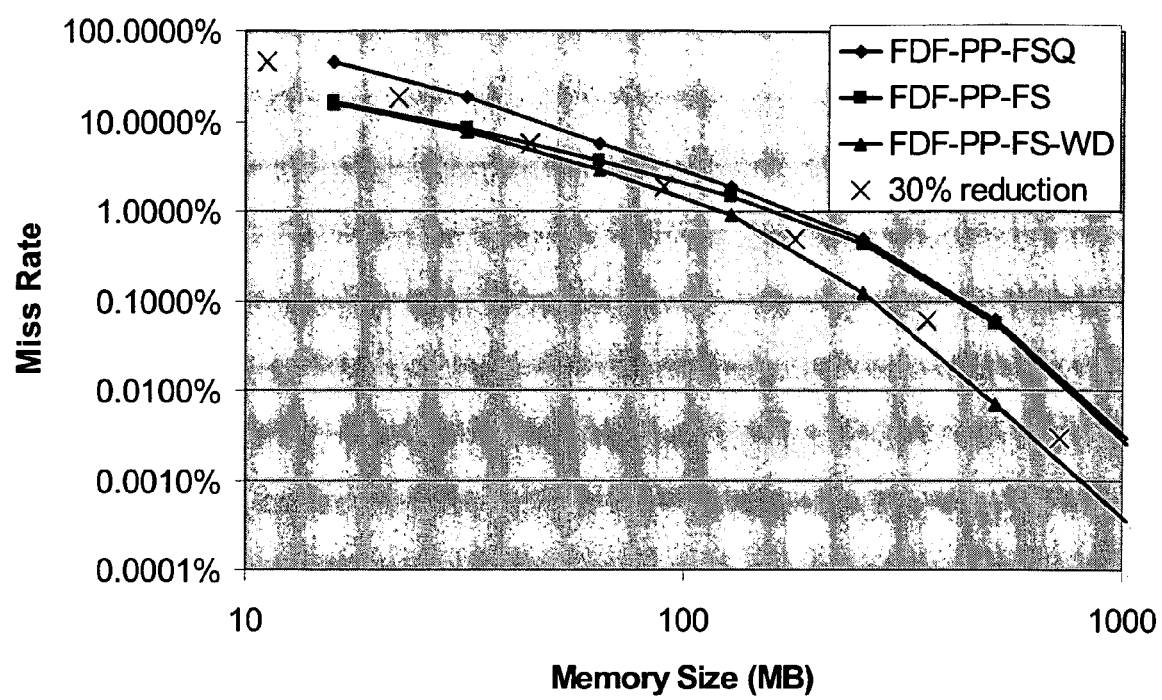

In the graph shown in FIG. 18, the base plot line is labeled "FDF-PP-FSQ." In this base plot line, prefetching is simulated with the "perfect" prefetching technique, but no sorting is performed. "FSQ" indicates that the requested page and the sequentially following pages on the disk (up to the block size) are read into memory. The "FDF-PP-FS" plot line shows miss rates for a read-order continuous sorting algorithm with "perfect" prefetching. The "FDF-PP-FS-WD" plot line shows miss rates for a read-order continuous sorting algorithm with "perfect" prefetching on a pre-warmed disk. The miss rates are plotted as a function of memory size, and both the memory sizes and miss rate percentages are shown in a logarithmic scale. Reference points for 30% reductions in miss rate also are shown in this Figure.

As shown in FIG. 18, sorting the disk according to a read-order continuous sorting algorithm with "perfect" prefetching provides a benefit in terms of miss rate, especially at lower memory sizes and in a "warm disk" context. Although the "warm disk" reduction in miss rate shown in this Figure is optimistic when compared with realistic disk conditions, FIG. 18 shows that running a read-order continuous sorting algorithm on a pre-sorted disk can have additional benefits.

Figure 19:
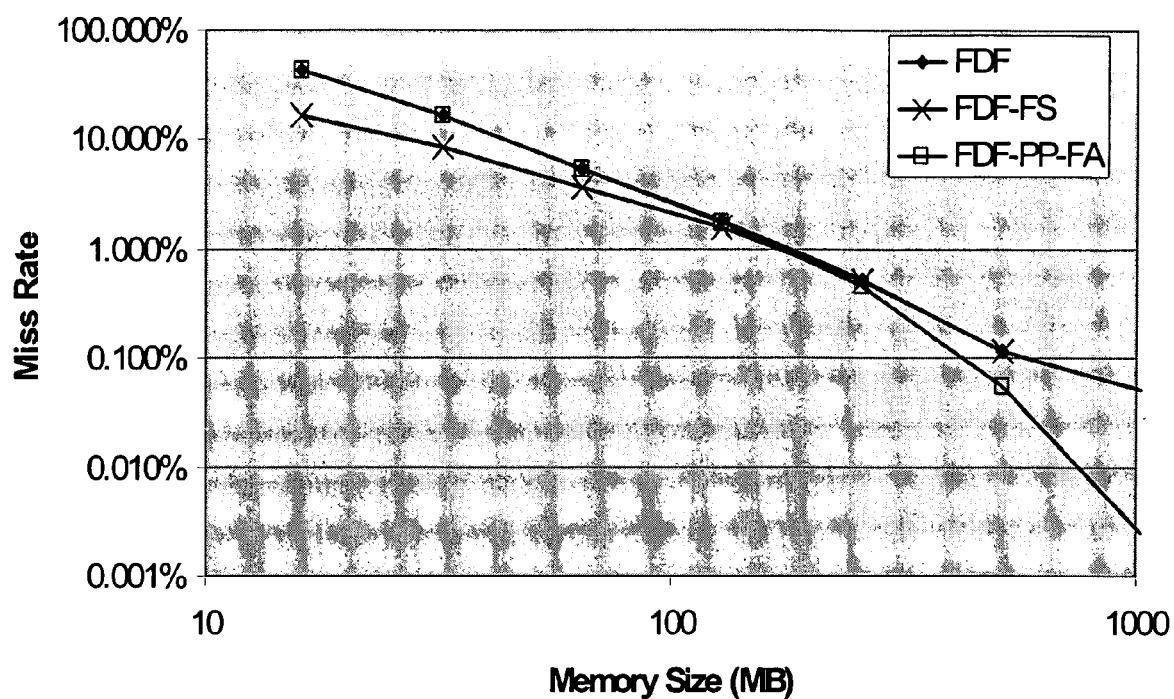
FIG. 19 is a graph that compares the use of "perfect" prefetching without disk sorting and the use of a continuous sorting algorithm without prefetching.

FIG. 19 compares the relative benefits of a read-order continuous sorting algorithm and prefetching by showing simulated miss rates for a system prepared with "perfect" prefetching without disk sorting (the plot line labeled FDF-PP-FA) and simulated miss rates for a system using a read-order continuous sorting algorithm without prefetching (the plot line labeled FDF-FS). As shown in FIG. 19, a read-order continuous sorting algorithm can provide more benefit (at some memory sizes) than "perfect" prefetching alone in terms of reduced miss rate.

Retirement Order Continuous Sorting

Figure 20:
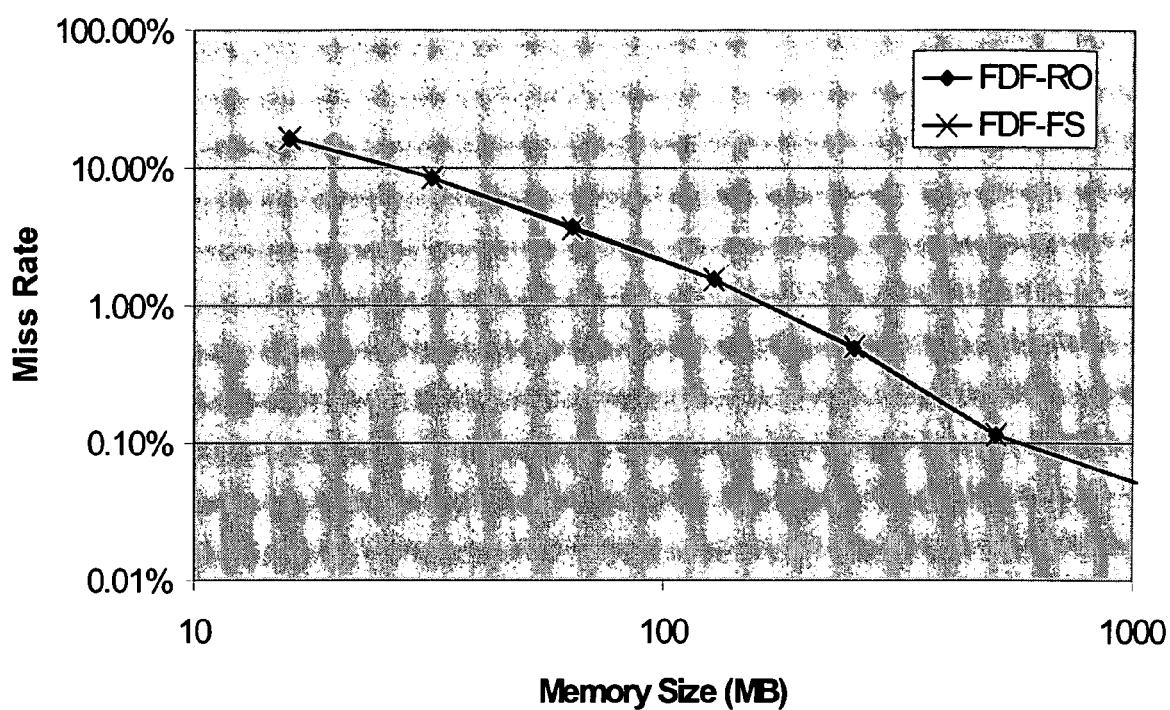
FIG. 20 is a graph showing simulated results for a retirement order continuous sorting algorithm.

In the graph shown in FIG. 20, simulated results of using a retirement-order continuous sorting algorithm are compared with a read-order continuous sorting algorithm. The "FDF-FS" plot line shows miss rates for a read-order continuous sorting algorithm, and the "FDF-RO" shows miss rates for a retirement-order continuous sorting algorithm. The miss rates are plotted as a function of memory size, with both miss rate percentages and memory sizes shown in a logarithmic scale.

In the example shown in FIG. 20, the reduction in miss rate provided by sorting the disk according to a retirement-order continuous sorting algorithm is nearly the same as the reduction in miss rate provided by sorting the disk according to a read-order continuous sorting algorithm. However, a retirement-order continuous sorting algorithm can improve efficiency in cases where pages in memory are being modified. Retirement-order sorting allows writes of pages that are being changed in memory to be delayed until they are retired from memory, potentially avoiding premature disk writes.

First Data Sort Continuous Sorting

Figure 21:
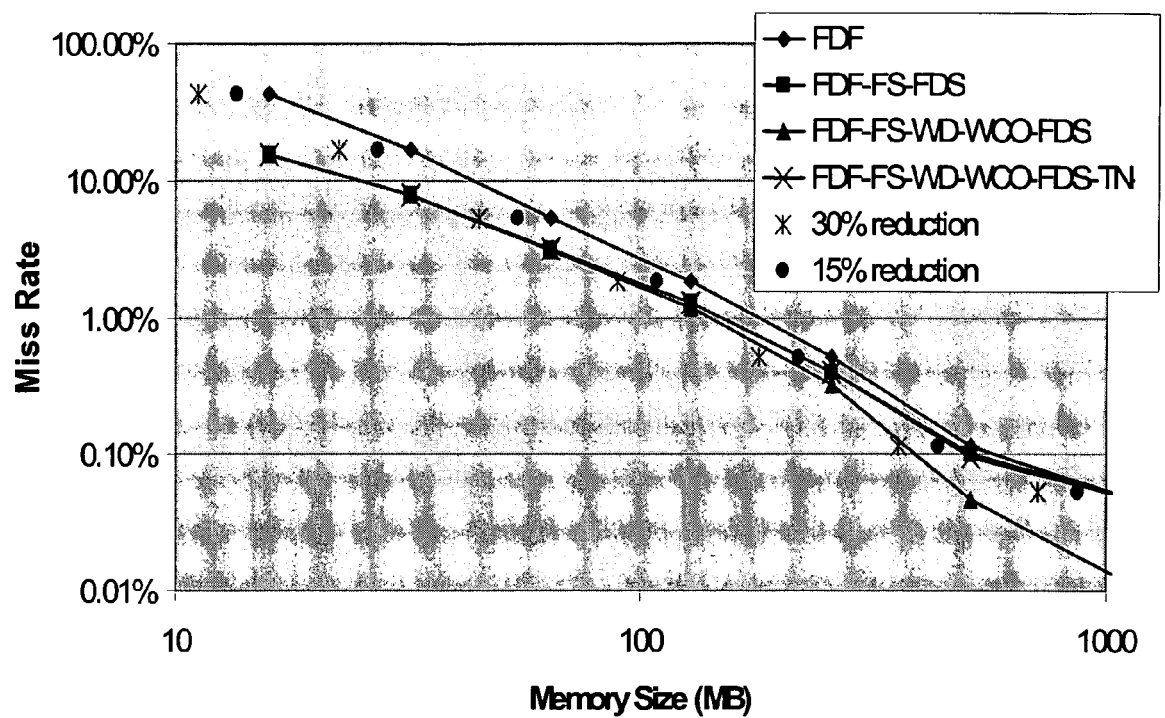
FIGS. 21 and 22 are graphs showing simulated results for a "first data sort" continuous sorting algorithm.

FIG. 21 shows simulated results of using a "first data sort" continuous sorting algorithm. The plot line labeled "FDF-FS-FDS" shows miss rates for a first data sort ("FDS") continuous sorting algorithm. FDS indicates that a page is to be sorted on the disk when it is first used, even if no page fault occurred (e.g., when a new data page is first used).

FIG. 21 also shows simulated results of sorting a disk in which code pages are not interspersed with data pages. The plot line labeled "FDF-FS-WD-WCO-FDS" shows miss rates for a first data sort continuous sorting algorithm on a warmed disk, which has been pre-sorted using the same first data sort algorithm. WCO (warm code only) indicates that only code pages have been warmed on the disk. This is done to simulate a sorted disk after an application terminates and temporary data pages are deleted, leaving a set of sorted code pages with no interspersed temporary data pages.

Figure 22:
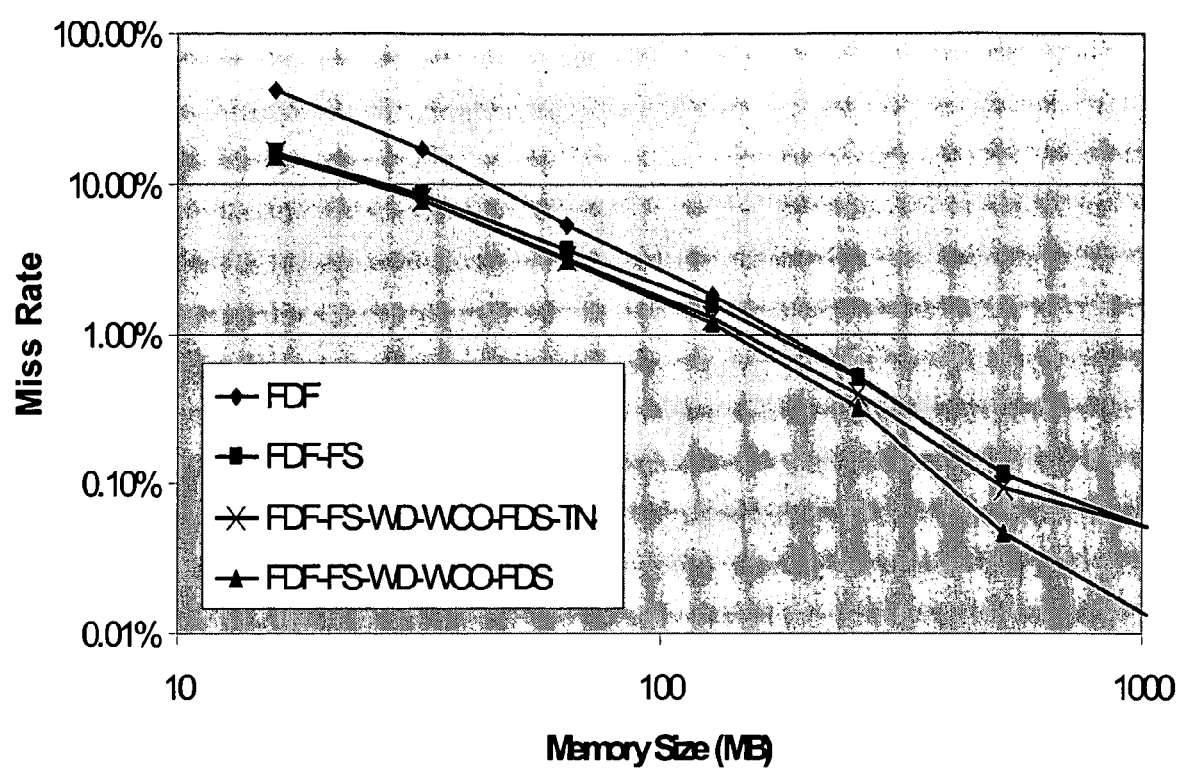
Figure 23:
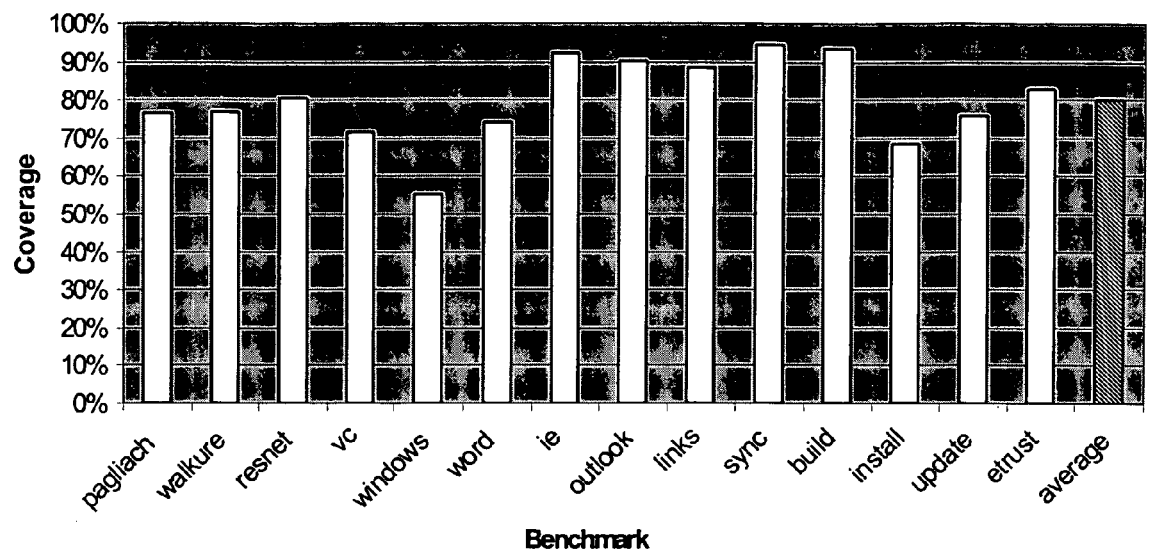
FIG. 23 is a graph showing percentages of code pages in benchmark applications that are covered by a training set of code pages.

For the plot line labeled "FDF-FS-WD-WCO-FDS-TN," TN indicates that a training set of pages was used to warm the disk. Because the training set is not exactly the same as the test set, the simulated performance of the algorithm is typically more realistic than when the disk is warmed with the same set of pages as the test set. FIG. 22 shows that the performance when the training set is different than the test set (FDF-FS-WD-WCO-FDS-TN) is not as good as when the training set is the same as the test set (FDF-FS-WD-WCO-FDS), but is still better than when using a cold disk (FDF-FS). FIG. 23 shows the percentage of code pages covered for each benchmark in the training set. We can expect even better results when the coverage of the training set approaches 100% of the evaluation runs.

The miss rates are plotted as a function of memory size, with both miss rate percentages and memory sizes shown in a logarithmic scale. As shown in FIG. 21, sorting the disk according to a "first data sort" continuous sorting algorithm provides a benefit in terms of reduced miss rate when compared to the "FDF" plot line.

2. Mark-and-split Sorting Simulation Results

Figure 24:
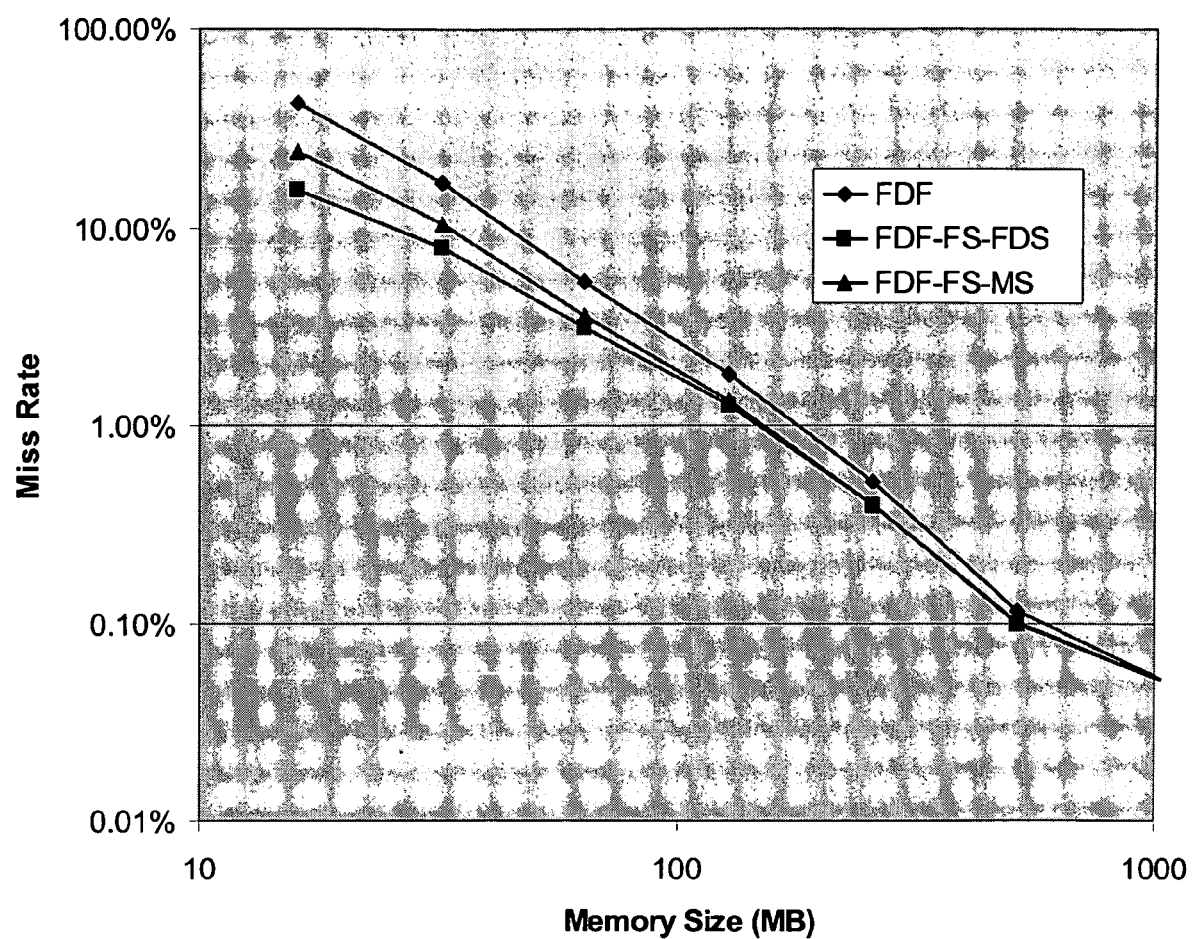
FIG. 24 is a graph showing simulated miss rates for continuous sorting and mark-and-split sorting algorithms.

In the graph shown in FIG. 24, miss rates are compared for a read-order continuous sorting and mark-and-split sorting algorithms. In the "FDF" base plot line, no sorting is performed. The "FDF-FS-FDS" plot line shows miss rates for a first data sort continuous sorting algorithm. The "FDF-FS-MS" plot line shows miss rates for a mark-and-split sorting algorithm. The miss rates are plotted as a function of memory size, and both the miss rate percentages and memory sizes are shown in a logarithmic scale.

As shown in FIG. 24, both the first data sort continuous sorting algorithm and the mark-and-split sorting algorithm provide reductions in miss rate when compared to the "FDF" plot line, especially at lower memory sizes. In this simulation, the first data sort continuous sorting algorithm provides greater reduction in miss rate for some memory sizes when compared with a mark-and-split sorting algorithm.

Having described and illustrated the principles of my invention with reference to various embodiments, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware, and vice versa.

In view of the many possible embodiments to which the principles of my invention may be applied, I claim as my invention all such embodiments as may come within the scope and spirit of the following claims and equivalents thereto.

I claim:

1. A method comprising:
   in response to each of plural page faults in a computer system:
      reading a requested virtual memory page;
      storing a first copy of the requested virtual memory page in memory of the computer system; and
      writing a second copy of the requested virtual memory page to a sorted set of pages on a computer-readable disk, the sorted set of pages having a sorted order based on a read order of the sorted set of pages.

2. The method of claim 1 wherein the plural page faults comprise soft page faults and hard page faults.

3. The method of claim 1 wherein reading the requested virtual memory page comprises reading the requested virtual memory page from the computer-readable disk.

4. The method of claim 1 wherein reading the requested virtual memory page comprises reading the requested virtual memory page from a buffer.

5. The method of claim 1 further comprising, in response to a first modification of a data page in the memory, writing a copy of the modified data page to the sorted set of pages.

6. The method of claim 1 further comprising, in response to a new data page in the memory, writing a copy of the new data page to the sorted set of pages.

7. The method of claim 1 wherein the writing is performed only if the requested virtual memory page is a data page.

8. The method of claim 1 further comprising prefetching at least one of the plural virtual memory pages into memory after one of the plural page faults.

9. The method of claim 1 wherein the requested virtual memory page is a previously sorted virtual memory page in the sorted set of pages, and further comprising reading a block of virtual memory pages into the memory, the block comprising:
   a copy of the previously sorted virtual memory page; and
   a copy of at least one other virtual memory page from the sorted set of pages.

10. The method of claim 9 further comprising, prior to the request for the previously sorted virtual memory page, deleting one or more temporary data pages from the sorted set of pages when they are no longer in use.

11. The method of claim 9 further comprising:
   writing a copy of the previously sorted virtual memory page back to the sorted set of pages, wherein the writing results in a new sorted order for the sorted set of pages.

12. The method of claim 9 wherein the block of virtual memory pages comprises 32 virtual memory pages.

13. The method of claim 1 wherein the requested virtual memory page is sorted only once within a time window.

14. One or more computer-readable storage media having stored thereon computer-executable instructions for performing a method comprising:
   in response to each of plural page faults in a computer system:
      reading a requested virtual memory page;
      storing a first copy of the requested virtual memory page in memory of the computer system; and
      writing a second copy of the requested virtual memory page to a sorted set of pages on a computer-readable disk, the sorted set of pages having a sorted order based on a read order of the sorted set of pages.

15. A method comprising:
   for each of plural virtual memory pages:
   retiring the virtual memory page from memory in a computer system; and
   writing a copy of the virtual memory page to a sorted set of pages on a computer-readable disk, the sorted set of pages having a sorted order, the sorted order based on a retirement order of the plural virtual memory pages.

16. The method of claim 15 wherein retiring comprises overwriting the plural virtual memory pages in memory.

17. The method of claim 15 wherein at least one of the plural retired virtual memory pages is modified in memory prior to the writing.

18. One or more computer-readable storage media having stored thereon computer-executable instructions for performing a method comprising:
   for each of plural virtual memory pages:
   retiring the virtual memory page from memory in a computer system; and
   writing a copy of the virtual memory page to a sorted set of pages on a computer-readable disk, the sorted set of pages having a sorted order, the sorted order based on a retirement order of the plural virtual memory pages.

19. A method comprising:
   in response to an access occurring within a first time window of one or more pages in memory of a computer system, marking the one or more accessed pages for inclusion in a first phase group; and
   at the end of the first time window, marking one or more pages not accessed within the first time window for inclusion in a second phase group; and
   writing a copy of each of the one or more accessed pages and each of the one or more not-accessed pages to a sorted set of pages on the disk, the sorted set of pages having a sorted order, the sorted order based on the first phase group and the second phase group.

20. One or more computer-readable storage media having stored thereon computer-executable instructions for performing a method comprising:
   in response to an access occurring within a first time window of one or more pages in memory of a computer system, marking the one or more accessed pages for inclusion in a first phase group; and
   at the end of the first time window, marking one or more pages not accessed within the first time window for inclusion in a second phase group; and
   writing a copy of each of the one or more accessed pages and each of the one or more not-accessed pages to a sorted set of pages on the disk, the sorted set of pages having a sorted order, the sorted order based on the first phase group and the second phase group.

* * * * *